United States Patent
Mueller

(10) Patent No.: US 6,814,913 B2
(45) Date of Patent: Nov. 9, 2004

(54) POLYESTER TRAY PACKAGE WITH LIDDING FILM HAVING GLYCOL-MODIFIED COPOLYESTER SEALANT LAYER

(75) Inventor: Walter B. Mueller, Inman, SC (US)

(73) Assignee: Cryovac, Inc., Duncan, SC (US)

( * ) Notice: Subject to any disclaimer, the term of this patent is extended or adjusted under 35 U.S.C. 154(b) by 155 days.

(21) Appl. No.: 10/294,182

(22) Filed: Nov. 14, 2002

(65) Prior Publication Data

US 2003/0116880 A1 Jun. 26, 2003

Related U.S. Application Data

(62) Division of application No. 09/164,109, filed on Sep. 30, 1998, now Pat. No. 6,503,549.

(51) Int. Cl.[7] ............................................... B29C 47/06
(52) U.S. Cl. ............................ 264/173.13; 264/173.15; 264/173.16; 264/288.4
(58) Field of Search ....................... 264/173.13, 173.15, 264/173.16, 210.1, 288.4

(56) References Cited

U.S. PATENT DOCUMENTS

| 4,698,246 A | 10/1987 | Gibbons et al. |
| 5,000,991 A | 3/1991 | Hayashi et al. |
| 5,077,109 A * | 12/1991 | Lustig et al. ............. 428/36.91 |
| 5,595,750 A * | 1/1997 | Jacobson et al. ............ 424/421 |
| 5,721,028 A | 2/1998 | Suzuki et al. |
| 6,203,750 B1 * | 3/2001 | Ahlgren et al. .............. 264/514 |
| 6,503,549 B1 * | 1/2003 | Mueller ....................... 426/396 |
| 6,562,476 B2 * | 5/2003 | Shepard et al. ........... 428/475.8 |
| 6,685,872 B2 * | 2/2004 | Dooley et al. ............... 264/514 |
| 2001/0003021 A1 * | 6/2001 | Shepard et al. ........... 428/475.8 |

FOREIGN PATENT DOCUMENTS

| CA | 2109287 | 4/1994 |
| CH | 682 996 A5 | 12/1993 |
| JP | 63 017 048 | 1/1988 |
| JP | 5 212 840 | 8/1993 |
| WO | 97/22422 | 6/1997 |

* cited by examiner

Primary Examiner—Mark Eashoo
(74) Attorney, Agent, or Firm—Mark B. Quatt

(57) ABSTRACT

A tray-type package is disclosed which includes a polyester support member, a product contained on the support member, and a lidding film containing the product and sealed to the periphery of the support member, the lidding film including a sealant layer of a polyester copolymer having greater than about 50% by mole of glycol polymerization units. Preferably, the support member is a foamed or nonfoamed polyethylene terephthalate (PET) tray and the lidding film is a multilayer film which includes a glycol-modified PET sealant layer. Also disclosed is a lidding film having a sealant layer of a blend of a glycol-modified PET and at least one further polymeric component.

9 Claims, No Drawings

POLYESTER TRAY PACKAGE WITH LIDDING FILM HAVING GLYCOL-MODIFIED COPOLYESTER SEALANT LAYER

This application is a divisional of 09/164,109, filed Sep. 30, 1998, now U.S. Pat. No. 6,503,549.

FIELD OF THE INVENTION

The present invention is directed to polyester tray packages having lidding films which are directly sealable to the polyester tray and which contain glycol-modified copolyester sealant layers. More specifically, the present invention is directed to polyethylene terephthalate (PET) tray packages having lidding films which include glycol-modified polyethyelene terephthalate sealant layers.

BACKGROUND OF THE INVENTION

Polyethylene terephthalate (PET) trays are employed in packaging a wide variety of products. PET trays are especially preferred for use in packaging various food products because of the polymers superior mechanical properties, transparency, low extractability by contents and good flavor retention of contents. PET trays may be foamed or non-foamed, depending on the required end-use application, and are preferred over foamed and non-foamed polystyrene trays because of their recyclability.

However, PET has a very high melting point of 260° C. which makes heat sealing difficult. That is, readily available olefin-based lidding films cannot be heat sealed to PET trays because such films typically have a sealing window with an upper limit well below 260° C. and will burn at sealing temperatures above the upper end of that range. Some PET films can be sealed to PET trays at about 260° C. but such an elevated heat sealing operation is not commercially practicable in a typical packaging facility.

Monolayer films which consist of glycol-modified polyethylene terephthalate have been found to provide adequate seals to foamed and nonfoamed PET trays. Such glycol-modified PET films can be sealed to PET trays in a sealing window range of from about 115° C. to about 210° C. However, such monolayer films do not provide gas barrier properties which are desirable for certain end-use applications

SUMMARY OF THE INVENTION

In a first aspect, the present invention is directed to a package which includes a polyester support member, a product contained on the support member, and a multilayer lidding film containing the product and sealed to the periphery of the support member, the lidding film including a sealant layer of a polyester copolymer having greater than about 50% by mole of glycol polymerization units.

In a second aspect, the present invention is directed to a package which includes a polyester support member, a product contained on the support member, and a lidding film containing the product and sealed to the periphery of the support member, the lidding film including a sealant layer of a polyester copolymer having greater than about 50% by mole of glycol polymerization units and at least one further polymeric component.

In a third aspect, the present invention is directed to a method for making a package which includes the steps of coextruding a multilayer lidding film which includes a sealant layer of a polyester copolymer having greater than about 50% by mole of glycol polymerization units, providing a polyester support member, placing a product on the support member, extending the lidding film above the support member and product with the sealant layer being immediately above and adjacent to the support member and the product, and sealing the lidding film to the support member such that the product is enclosed by the film and such that the sealant layer is directly sealed to periphery of the support member.

In a fourth aspect, the present invention is directed to a method for making a package which includes the steps of extruding a multilayer lidding film which includes a sealant layer of a blend of a polyester copolymer having greater than about 50% by mole of glycol polymerization units and at least one further polymeric component, providing a polyester support member, placing a product on the support member, extending the lidding film above the support member and product with the sealant layer being immediately above and adjacent to the support member and the product, and sealing the lidding film to the support member such that the product is enclosed by the film and such that the sealant layer is directly sealed to periphery of the support member.

Definitions

As used herein, the phrase "abuse layer" refers to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal.

As used herein, "oxygen transmission rate", also referred to as "OTR" and "oxygen permeability", is measured according to ASTM D 3985, a test known to those of skill in the film art.

As used herein, the term "lamination", and the phrase "laminated film", refer to the process, and resulting product, made by bonding together two or more layers of film or other materials Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at the softening temperature but below the melting temperature, followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions As used herein, the phrases hot blown or hot blowing refer an extrusion process as well as a characteristic of the resultant film. In a hot blown process, molten plastic material is forced through an annular die and is immediately inflated to a diameter typically two to four times that of the melt exiting the die. Hot blown films do possess orientation; but since the films are oriented at or very near to the melt temperature they will only shrink when heated to that high temperature which is much higher than the temperature required to shrink conventional oriented films. For this reason, hot blown films do not exhibit shrink within the temperature range useful for food packaging since the film must be heated to nearly melting in order to observe any appreciable degree of shrinkage. Hot blown films may be referred to as melt state oriented films.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers blended therewith.

As used herein, the term "homopolymer" is used with reference to a polymer resulting from the polymerization of a single monomer, i.e, a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an α-olefin, such as 1-hexene. However, the term "copolymer" is also inclusive of, for example, the copolymerization of a mixture of ethylene, propylene, 1-hexene, and 1-octene As used herein, the term "polymerization" is inclusive of homopolymerizations, copolymerizations, terpolymerizations, etc, and includes all types of copolymerizations such as random, graft, block, etc. In general, the polymers, in the films used in accordance with the present invention, can be prepared in accordance with any suitable catalytic polymerization process, including solution polymerization, slurry polymerization, gas phase polymerization, and high pressure polymerization processes Slurry polymerization processes generally use superatmospheric pressures and temperatures in the range of 40°–100° C. In a slurry polymerization, a suspension of solid, particulate polymer is formed in a liquid polymerization medium to which ethylene and comonomers and often hydrogen along with catalyst are added The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, gas-phase polymerization process utilizes superatmospheric pressure and temperature in the range of about 50°–120° C. Gas phase polymerization can be performed in a stirred or fluidized bed of catalyst and product particles in a pressure vessel adapted to permit the separation of product particles from unreacted gases Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

High pressure polymerization processes utilize a catalyst system comprising a cyclopentadienyl-transition metal compound and an alumoxane compound. It is important, in the high-pressure process, that the polymerization temperature be above about 120° C., but below the decomposition temperature of the polymer product. It is also important that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent However, the first listed monomer preferably is polymerized in a higher weight percent than the second listed monomer, and, for copolymers which are terpolymers, quadripolymers, etc., preferably, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e g., "an ethylene/α-olefin copolymer"), identifies the comonomers which are copolymerized to produce the copolymer. Such phrases as "ethylene α-olefin copolymer" is the respective equivalent of "ethylene/α-olefin copolymer."

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The composition distribution breadth index (CDBI) of such homogeneous copolymers will generally be greater than about 70 percent The CDBI is defined as the weight percent of the copolymer molecules having a comonomer content within 50 percent (i.e, plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982) Preferably, the homogeneous copolymers have a CDBI greater than about 70%, ie., a CDBI of from about 70% to 99%. In general, the homogeneous copolymers in the lidding films of the present invention also exhibit a relatively narrow melting point range, in comparison with "heterogeneous copolymers", i.e., polymers having a CDBI of less than 55%. Preferably, the homogeneous copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/α-olefin copolymer can, in general, be prepared by the copolymerization of ethylene and any one or more α-olefin. Preferably, the α-olefin is a $C_3$–$C_{20}$ α-monoolefin, more preferably, a $C_4$–$C_{12}$ α-monoolefin, still more preferably, a $C_4$–$C_8$ α-monoolefin. Still more preferably, the α-olefin comprises at least one member selected from the group consisting of butene-1, hexene-1, and octene-1, ie, 1-butene, 1-hexene, and 1-octene, respectively. Most preferably, the α-olefin comprises octene-1, and/or a blend of hexene-1 and butene-1.

Processes for preparing homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of one genus of homogeneous ethylene/α-olefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/α-olefin copolymers is disclosed in U.S. Pat. No. 5,272,236, to LAI, et. al., and U.S. Pat. No. 5,278,272, to LAI, et. al, both of which are hereby incorporated in their entireties, by reference thereto.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers they catalyze the polymerization of.

As used herein, the phrase "vinyl aromatic", with respect to monomers, refers to styrene, vinyl toluene, vinylnaphthalene, and vinylanthracene, with or without one or more substituents (for hydrogens) present on the aromatic ring(s), and/or the olefin carbon connected to the aromatic ring. Furthermore, this phrase is used herein with reference to polymerization units of the above monomers. Preferably, the vinyl aromatic monomer is styrene.

As used herein, the phrase "alpha-olefin", and the phrase "alpha-olefin monomer", refer to olefinic compounds, whether unsubstituted or substituted, in which the first two carbon atoms in the chain have a double bond there between. Furthermore, as used herein, both of these phrases are inclusive of ethylene and propylene.

As used herein, the phrase "polymerization unit" refers to a unit of a polymer derived from a monomer used in the polymerization reaction. For example, the phrase "alpha-olefin polymerization units" refers to a unit in, for example, an alpha-olefin/vinyl aromatic copolymer, the polymerization unit being that residue which is derived from the alpha-olefin monomer after it reacts to become a component of the polymer chain.

As used herein, the phrase "vinyl aromatic polymerization unit" refers to a corresponding polymerization unit of the polymer from the polymerization, which is the residue derived from the vinyl aromatic monomer after it reacts to become a component of the polymer chain.

As used herein, copolymers, terpolymers, etc. are named in terms of the monomers from which they are produced. For example, an "ethylene/alpha-olefin copolymer" is a copolymer comprising polymerization units derived from the copolymerization of ethylene monomer and alpha-olefin monomer, with or without additional comonomer(s) Likewise, an alpha-olefin/vinyl aromatic copolymer is a copolymer comprising polymerization units derived from the copolymerization of alpha-olefin monomer with vinyl aromatic comonomer, with or without additional comonomer(s).

As used herein, the term "polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymers, polyethylene homopolymers, polybutene, propylene/α-olefin copolymers, ethylene/α-olefin copolymers, butene/α-olefin copolymers, ethylene/vinyl acetate copolymers, ethylene/ethyl acrylate copolymers, ethylene/butyl acrylate copolymers, ethylene/methyl acrylate copolymers, ethylene/acrylic acid copolymers, ethylene/methacrylic acid copolymers, modified polyolefin resins, ionomer resins, polymethylpentene, etc. The modified polyolefin resins include modified polymers prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", polyethylene", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type As used herein, the term "polypropylene" refers to any polymer comprising propylene polymerization units, regardless of whether the polymer is a homopolymer or a copolymer, and further includes blends of such homopolymers and copolymers The phrase "propylene polymerization units", as used herein, refers to polymerization units in a polymer chain, the repeating units being derived from the polymerization of unsubstituted propylene monomer and/or substituted propylene polymer, the double bond being opened in the polymerization reaction.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene/alpha-olefin copolymer", and "ethylene/α-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT™ materials supplied by Exxon, and TAFMER™ materials supplied by Mitsui Petrochemical Corporation These materials generally include copolymers of ethylene with one or more comonomers selected from $C_4$ to $C_{10}$ alpha-olefins such as butene-1 (i e., 1-butene), hexene-1, octene-1, etc. in which the molecules of the copolymers comprise long chains with relatively few side chain branches or cross-linked structures This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/α-olefin copolymers, such as the long chain branched homogeneous ethylene/α-olefin copolymers available from the Dow Chemical Company, known as AFFINITY™ resins, are also included as another type of alpha-olefin copolymer useful in the present invention.

In general, the ethylene/α-olefin copolymer comprises a copolymer resulting from the copolymerization of from about 80 to 99 weight percent ethylene and from 1 to 20 weight percent α-olefin. Preferably, the ethylene α-olefin copolymer comprises a copolymer resulting from the copolymerization of from about 85 to 95 weight percent ethylene and from 5 to 15 weight percent α-olefin.

As used herein, the phrases "inner layer," "internal layer" and interior layer refer to any layer, of a multilayer film, having both of its principal surfaces directly adhered to another layer of the film.

As used herein, the phrases "outer layer," external layer and exterior layer refer to any film layer of a multilayer film having only one of its principal surfaces directly adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer there between. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner (i.e., internal) film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the term "sealed" refers to any and all means of closing the package, such as heat sealing via hot air and/or heated bar, and ultrasonic sealing.

As used herein, the phrases "seal layer", "sealing layer", "heat sealing layer" and "sealant layer", refers to an outer film layer involved in the sealing of the lidding film to the polystyrene support member.

As used herein, the phrase "tie layer" refers to any inner layer having the primary purpose of adhering two layers to one another. In general, suitable polymers for use in tie layer include polymers having polar functional groups.

As used herein, the phrase "skin layer" refers to an outer layer of a multilayer film used in a package containing a product, wherein the film is used to make the package so that the outer layer is an outside layer with respect to the package. Such outside outer film layers are subject to abuse during storage and handling of the packaged product.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, ie., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art Although the majority of the above definitions are substantially as understood by those of skill in the art, one or more of the above definitions may be defined herein above in a manner differing from the meaning as ordinarily understood by those of skill in the art, due to the particular description herein of the present invention.

DETAILED DESCRIPTION OF ILLUSTRATIVE EMBODIMENTS

The present invention is directed to a lidding film for use with polyester trays which at least includes a sealing layer of a glycol-modified polyester. In one embodiment the lidding film is a multilayer film which preferably includes a barrier layer In an alternative embodiment the sealing layer includes at least one further polymeric component in addition to the glycol-modified polyester.

The glycol-modified polyester of the present sealant layer is a copolymerized polyester which has greater than 50% by mole of glycol polymerization units. The remainder of the copolymer comprises acid polymerization units, preferably terephthalic acid polymerization units and, optionally, diol polymerization units other than glycol polymerization units. One example of a copolymer which is a glycol-modified PET in accordance with the present invention is one comprised of polymerization units derived from terephthalic acid, cyclohexanedimethanol, and ethylene glycol, wherein the copolymer comprises greater than 50% by mole of glycol polymerization units. Another copolymer which is considered to be a glycol-modified PET in accordance with the present invention is one comprised of polymerization units derived from terephthalic acid, diethylene glycol, and ethylene glycol, wherein the copolymer comprises greater than 50% by mole of glycol polymerization units. Other acid polymerization units which may be employed include those derived from isophthalic acid, naphthalenedicarboxylic acid, maleic acid, fumaric acid, succinic acid, adipic acid, sebacic acid, and cyclohexanedicarboxylic acid Other diol polymerization units which may be employed include those derived from propylene glycol, butanediol, neopentyl glycol, hexylene glycol, triethylene glycol, glycerol, mannitol, pentaerythritol and sorbitol.

In one embodiment, in addition to the glycol-modified copolyester the sealant layer includes at least one further polymeric component. Useful blending polymers include, but are not limited to, other polyesters, polyolefins, polystyrene, polyamides, and the like Preferably the further polymeric component of the sealant layer is a polyolefin, more preferably an ethylene copolymer, most preferably a copolymer of ethylene and a comonomer selected from the group consisting of vinyl acetate, alkyl acrylate, alpha-olefin, and acrylic acid. When a blending polymer is included in the sealant layer, the present film may optionally be a monolayer film.

Preferably the sealant layer has a thickness of from about 0.01 mil to about 1 mil, more preferably from about 0.05 mil to about 0.75 mil, most preferably from about 0.10 mil to about 0.50 mil. The thickness preferably is from about 1 to about 50%, more preferably from about 5 to about 30%, most preferably from about 10 to about 15% of the total thickness of the multilayer film.

In a preferred embodiment the present film is a multilayer film. Most preferably the multilayer film in accordance with the present invention includes a barrier layer having a low permeance to oxygen, preferably an oxygen permeance of no more than about (in ascending order of preference) 150 $cm^3/m^2atm$ 24 hours, 125 $cm^3/m^2atm$ 24 hours, 100 $cm^3/m^2atm$ 24 hours, 75 $cm^3/m^2atm$ 24 hours, 60 $cm^3/m^2atm$ 24 hours, 50 $cm^3/m^2atm$ 24 hours, 40 $cm^3/m^2atm$ 24 hours, 30 $cm^3/m^2atm$ 24 hours, 25 $cm^3/m^2atm$ 24 hours, 20 $cm^3/m^2atm$ 24 hours, and 15 $cm^3/m^2atm$ 24 hours (at 25 C. and 0% relative humidity) The barrier layer preferably has a thickness of from about 0 01 mil to about 1 mil, more preferably from about 0.05 mil to about 0.75 mil, most preferably from about 0.10 mil to about 0.50 mil. The thickness preferably is from about 1 to about 50%, more preferably from about 5 to about 30%, most preferably from about 5 to about 20% of the total thickness of the multilayer film.

The barrier layer preferably comprises at least one member selected from the group consisting of EVOH, PVDC, polyethylene carbonate, polyamide, and polyester. In one preferred embodiment, the barrier layer comprises EVOH having from about 32 to about 48 mole percent ethylene mer; more preferably, having from about 38 mole percent ethylene to about 46 mole percent ethylene mer.

Preferably, the multilayer film of the present invention has an oxygen permeance of no more than about (in ascending order of preference) 150 cm$^3$/m$^2$atm 24 hours, 125 cm$^3$/m$^2$atm 24 hours, 100 cm$^3$/m$^2$atm 24 hours, 75 cm$^3$/m$^2$atm 24 hours, 60 cm$^3$/m$^2$atm 24 hours, 50 cm$^3$/m$^2$atm 24 hours, 40 cm$^3$/m$^2$atm 24 hours, 30 cm$^3$/m$^2$atm 24 hours, 25 cm$^3$/m$^2$atm 24 hours, 20 cm$^3$/m$^2$atm 24 hours, and 15 cm$^3$/m$^2$atm 24 hours (at 25 C. and 0% Relative Humidity).

Preferably, the multilayer film of the present invention includes at least one or more tie-layers As a general rule, tie layers should have a relatively high degree of compatibility with layers comprising EVOH, polyamide, polyester, PVDC, etc., as well as non-barrier layers, such as polyolefins. The composition, number, and thickness of tie layers is as known to those of skill in the art. Such a tie layer can have a thickness of from about 0 01 mil to about 1 mil, more preferably from about 0.05 mil to about 0.75 mil, most preferably from about 0.05 mil to about 0.50 mil. The thickness preferably is from about 1 to about 50%, more preferably from about 5 to about 30%, most preferably from about 5 to about 20% of the total thickness of the multilayer film. Such tie layers can include one or more polymers that contain mer units derived from at least one of $C_2$–$C_{12}$ α-olefin, styrene, amide, ester, and urethane, preferably one or more of anhydride-grafted ethylene/α-olefin interpolymer, anhydride-grafted ethylene/ethylenically unsaturated ester interpolymer, and anhydride-grafted ethylene/ethylenically unsaturated acid interpolymer Optionally, the multilayer film of the present invention may include one or more bulk layers. Such bulk layers are included in order to increase the thickness and thereby the abuse-resistance, toughness, modulus, etc. of the overall film structure. Generally, bulk layer comprise polymers which are inexpensive relative to other polymers in the film. Preferably, the bulk layer of the present multilayer film comprises a polyolefin, most preferably an ethylene homopolymer or copolymer. Such a bulk layer can have a thickness of from about 0.10 mil to about 3 mils, more preferably from about 0.3 mil to about 1.5 mils, most preferably from about 0.5 mil to about 1.0 mil. The thickness preferably is from about 10 to about 70%, more preferably from about 20 to about 50%, most preferably from about 30 to about 40% of the total thickness of the multilayer film.

Additionally, the multilayer film of the present invention includes an outside layer which may serve as an abuse layer. Preferably the outer abuse layer comprises one or more polymers which serve to resist abrasion, puncture, and other potential causes of reduction of package integrity, as well as potential causes of reduction of package appearance quality. Optionally, the outer abuse layer comprises a polyester which may be identical to the copolyester of the sealant layer; however, other abuse resistant polymers such as polyamides, polyurethanes, polystyrenes and certain polyolefins may also be employed. The abuse layer preferably has a thickness of from about 0.01 mil to about 1 mil, more preferably from about 0.05 mil to about 0.75 mil, most preferably from about 0.10 mil to about 0.50 mil. The thickness preferably is from about 1 to about 50%, more preferably from about 5 to about 30%, most preferably from about 10 to about 20% of the total thickness of the multilayer film.

The film can have additional layers, these layers preferably have a thickness and composition similar to the layers described supra.

The film of the present invention is preferably formed by a hot blown extrusion or coextrusion method. That is, the molten resins making up the layer or layers of the ultimate film are forced through an annular die and then immediately blown to a desired diameter which results in a desired film thickness. Such process imparts at least a minor degree of molecular orientation to the formed film. Other methods of film extrusion, although less preferred, may also be employed Optionally, the present film may be oriented, either out of hot air or hot water, in order to render it heat shrinkable. If the film is oriented, it is most preferably subsequently annealed or heat set. That is, following orientation and cooling the film may be reheated to or near its orientation temperature, either in a constrained or nonconstrained configuration, in order to dimensionally stabilize the film and to impart desirable mechanical properties.

The film of the present invention preferably exhibits a sufficient Young's modulus so as to withstand normal handling and use conditions. It preferably has a Young's modulus of at least about 200 MPa; more preferably, at least about 230 MPa; more preferably, at least about 260 MPa; more preferably, at least about 300 MPa, more preferably, at least about 330 MPa, more preferably, at least about 360 MPa; and more preferably, at least about 400 MPa. (Young's modulus is measured in accordance with ASTM D 882, the teaching of which is incorporated herein by reference.)

Preferably, the film according to the present invention comprises a total of from 1 to 20 layers; more preferably, from 1 to 12 layers; more preferably, from 2 to 9 layers; more preferably, from 3 to 8 layers. Optionally, the multilayer film of the invention consists of 1, 2, 3, 4, 5, 6, 7, 8, 9, 10, 11, or 12 layers While adjacent layers can have the same or similar composition, preferably, adjacent layers have different compositions.

Preferably, the film has a thickness uniformity of at least 20 percent; more preferably, at least 30 percent; still more preferably, at least 40 percent; yet still more preferably, at least 50 percent; even yet still more preferably, at least 60 percent; still more preferably, at least 70 percent; still more preferably, at least 80 percent; and, still more preferably, at least 85 percent.

The film of the present invention can have any total thickness desired, so long as the film provides the desired properties, e.g., elastic recovery, shrink force, optics, modulus, seal strength, etc., for the particular packaging operation in which the film is used. The film of the present invention preferably has a total thickness of from about 0.1 to about 10 mils, more preferably from about 0.5 to about 7 mils, more preferably from about 1 to about 5 mils.

The lidding film of the present invention can be irradiated and/or corona treated. The former technique involves subjecting a film material to radiation such as corona discharge, plasma, flame, ultraviolet, X-ray, gamma ray, beta ray, and high energy electron treatment, any of which can alter the surface of the film and/or induce crosslinking between molecules of the polymers contained therein. The use of ionizing radiation for crosslinking polymers present in a film structure is disclosed in U.S. Pat. No. 4,064,296 (Bornstein et al.), the teaching of which is incorporated herein by reference. Irradiation can produce a cross-linked polymer network and is believed to facilitate the orientation process, and is also believed to improve the inter-ply adhesion between the layers, reduce edge tear, and give the film superior structural integrity.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. To produce crosslinking, the polymer is subjected to a suitable radiation dosage of high energy electrons, preferably using an electron accelerator, with a dosage level being determined by standard dosimetry methods. A suitable radiation dosage of high energy electrons is in the range of up to about 13–166 kGy, more preferably about 30–139 kGy, and still more preferably, 30–100 kGy. In certain embodiments, especially when the film of the invention is to be converted into bags, a lower radiation dosage is preferred. In such a scenario, a radiation dosage of from about 0–100 kGy; more preferably, 0–80 kGy, more preferably, 0–70 kGy; more preferably, 0–60 kGy; and more preferably, 0–40 kGy is preferred. Preferably, irradiation is carried out by an electron accelerator and the dosage level is determined by standard dosimetry methods. However, other accelerators such as a Van de Graaff or resonating transformer may be used. The radiation is not limited to electrons from an accelerator since any ionizing radiation may be used. A preferred amount of radiation is dependent upon the film and its end use.

Various combinations of layers can be used in the formation of the multilayer films according to the invention. Given below are some examples of preferred combinations in which letters are used to represent film layers (Only 2- through 4-layer embodiments are provided here for illustrative purposes; however, the multilayer films of the invention also can include more layers):

"A" represents a layer comprising a glycol-modified polyester, as described in the description of the sealant layer;

"B" represents a barrier layer, preferably as described above.

"C" represents a bulk layer as described above

"D" represents an abuse layer, preferably as described above.

A/B, A/C, A/D, A/B/C, A/B/D, A/C/B, A/B/C/D, A/C/B/D, A/D/B/D, A/C/B/C, A/B/C/B, A/B/D/B.

Of course, one or more tie layers can be used in any of the above structures.

In any one of these multilayer structures, a plurality of layers (A), (B), (C), & (D) may be formed of the same or different modified compositions and one or more tie-layers added.

The objects and advantages of this invention are illustrated by the following examples, which are provided for the purpose of representation, and are not to be construed as limiting the scope of the invention. The particular materials and amounts thereof, as well as other conditions and details, recited in these examples should not be used to unduly limit this invention. Unless stated otherwise, all percentages, parts, etc. are by weight.

The following resins were employed in the manufacture of lidding films in accordance with the present invention.

| | |
|---|---|
| tie-1: | CXA E-361, an anhydride modified ethylene/vinyl acetate supplied by DuPont; |
| tie-2: | Bynel 2174, an anhydride modified ethylene/methyl acrylate supplied by DuPont; |
| LDPE1. | a low density polyethylene having a density of 0.924 g/cc and a 0.88 MI, supplied by the Dow Chemical Co. and designated 609A, |
| LDPE2 | a low density polyethylene having a density of 0.921 g/cc and a 0.22 MI supplied by the Dow Chemical Co. and designated 1321, |
| EVOH1 | LC E151A, a ethylene vinyl alcohol having 44% by mole ethylene and a 1.6 melt flow, supplied by Evalca; |
| EVOH2: | Eval F101A, an ethylene vinyl alcohol having 32% by mole ethylene and a 1.3 melt flow, supplied by Evalca; |
| Ny-6: | Ultramid B4, a nylon 6 supplied by BASF; |
| MB: | an antiblock masterbatch based on Z7319, a nylon 12 supplied by Huls, |
| G-PET: | PET G 6763, an amorphous polyester copolymer, ethylene 1,4 cyclohexylenedimethylene terephthalate, supplied by Eastman, |
| PET1: | 12822, a polyethylene terephthalate homopolymer supplied by Eastman; |
| PET2: | 14766, a polyester copolymer supplied by Eastman; |
| PolyP: | X23372-151, a polymeric polyester plasticizer supplied by Eastman; and |
| EMA: | EMAC 2205, an ethylene/methyl acrylate copolymer supplied by Chevron. |

TABLE I

Lidding Films

| Film of Ex. No. | Thicknesses in mils (Target) | Sealant | Adhesive | Core | Adhesive | Barrier | Adhesive | Abuse |
|---|---|---|---|---|---|---|---|---|
| 1 | 2.0 | G-PET | tie-1 | LDPE1 | tie-1 | EVOH1 | tie-1 | G-PET |
|  | 1.5 | (10.2%) | (7.8%) | (35.4%) | (14.6%) | (14.6%) | (10.7%) | (7.8%) |
|  | 1.0 | | | | | | | |
| 2 | 5.0 | G-PET | tie-1 | LDPE2 | tie-1 | EVOH1 | tie-1 | PET1 |
|  | 2.0 | (10.2%) | (7.8%) | (35.4%) | (14.6%) | (14.6%) | (10.7%) | (7.8%) |
| 3 | 2.0 | G-PET | tie-1 | LDPE2 | tie-1 | EVOH1 | tie-1 | PET1 |
|  | 1.5 | (9.4%) | (7.3%) | (30.4%) | (15.7%) | (18.8%) | (6.3%) | (12.0%) |
|  | 1.0 | | | | | | | |
| 4 | 1.5 | G-PET | tie-2 | LDPE1 | tie-2 | EVOH1 | tie-2 | 90% Ny-6 |
|  |  | (15.0%) | (7.8%) | (22.2%) | (7.8%) | (14.4%) | (18.3%) | (14.4*) |
| 5 | 1.5 | 80% G-PET | tie-2 | LDPE1 | tie-2 | EVOH1 | tie-2 | 90% Ny-6 |
|  |  | 20% EMA | | | | | | 10% MB |
|  |  | (15.0%) | (7.8%) | (22.2%) | (7.8%) | (14.4%) | (18.3%) | (14.4%) |
| 6 | 1.5 | 80% G-PET | tie-2 | LDPE1 | tie-2 | EVOH1 | tie-2 | 90% Ny-6 |
|  |  | 20% tie-2 | | | | | | 10% MB |
|  |  | (15.0%) | (7.8%) | (22.2%) | (7.8%) | (14.4%) | (18.3%) | (14.4%) |

TABLE I-continued

| | | | | | Lidding Films | | | | | |
|---|---|---|---|---|---|---|---|---|---|---|
| 7 | 1.5 | 85% G-PET 15% PolyP (15.0%) | tie-2 (7.8%) | LDPE1 (22.2%) | tie-2 (7.8%) | EVOH1 (14.4%) | tie-2 (18.3%) | 90% Ny-6 10% MB (14.4%) | | |
| 8 | 1.5 | 80% G-PET 20% PET2 (15.0%) | tie-2 (7.8%) | LDPE1 (22.2%) | tie-2 (7.8%) | EVOH1 (14.4%) | tie-2 (18.3%) | 90% Ny-6 10% MB (14.4%) | | |

| Film of Ex. No. | Thicknesses in mils (Target) | Sealant | Adhesive | Adhesive | Barrier | Adhesive | Core | Adhesive | Abuse |
|---|---|---|---|---|---|---|---|---|---|
| 9 | 1.5 | 85% G-PET 15% PolyP | tie-2 | tie-1 | EVOH1 | tie-1 | LDPE1 | tie-1 | 90% Ny-6 10% MB |
| 10 | 1.5 | 80% G-PET 20% PolyP | tie-2 | tie-1 | EVOH1 | tie-1 | LDPE1 | tie-1 | 90% Ny-6 10% MB |
| 11 | 1.5 | 85% G-PET 15% PolyP | tie-2 | tie-1 | EVOH2 | tie-1 | LDPE1 | tie-1 | 90% Ny-6 10% MB |

The films of Examples 1–3, with the exception of the 2 mil film of Example 2, were crosslinked and dusted to reduce tackiness and then tested for sealability to CPET and APET trays on a Ross, Jr. machine at a seal time ranging from 1.02 to 4.02 seconds, at sealing temperatures ranging from 250–400° F. and with the vacuum and gas flush features off. One pound plastic blocks were used to weight the trays.

For those test packages prepared which exhibited an adequate lidding film to tray seal, the integrity of such seal was tested on a Visual Check Package Integrity tester. All films sealed well to the APET trays and such packages were tested at an initial level of 10 in. Hg vac. which was increased slowly until a leak developed or a blowout occurred. As is shown in Table II, below, only one film, the 1.5 mil film of Example 1, demonstrated adequate sealing to a CPET tray to warrant seal integrity testing. For that film the seal was tested at an initial level of 5 in. Hg vac. which was then increased slowly until the seal failed.

The films of Examples 1–3, with the exception of the 5 mil film of Example 2, were tested for oxygen permeability. The results, including actual rather than target thicknesses of the films tested, are reported in Table III, below. Generally, for the inventive films, oxygen permeability increased by approximately ⅔ when the relative humidity was raised from 0% to 80%. The oxygen permeability at 0% RH is also reported for a one mil sample of a Mylar control.

TABLE III

| | | Oxygen Permeability | |
|---|---|---|---|
| Film of Ex. No. | Thickness in mils (Avg.) | cc(STP)/(24 hrs.sq m.atm) 73° F. | |
| | | 0% RH | 80% RH |
| 1 | 1.24 | 13.00 | 21.80 |
| | 1.61 | 9.63 | 16.77 |
| | 2.09 | 7.50 | 12.93 |
| 2 | 2.03 | 5.10 | 7.93 |
| 3 | 1.06 | 11.93 | 17.63 |
| | 1.33 | 8.17 | N.T.* |
| | 1.54 | N.T.* | 11.43 |
| | 1.73 | 6.13 | 8.10 |
| Mylar Control | 1.00 | 77.5 | N.T.* |

*Not Tested

The films of Examples 4–11 were crosslinked and dusted to reduce tackiness. The films of Examples 4–8 were tested on a Ross, Jr. machine for sealing only and for sealing with vacuum and gas flush. The settings were 1) no vacuum, no gas, seal time 1.02 s, 350° F., 375° F., and 400° F.; and 2) vacuum—70 cm Hg, seal time—1.5–2.0 s, gas—60 psi, gas time—0.5–0.6 s, seal temp 350° F. However, none of the seals of the latter run were sufficiently strong to withstand the vacuum and gas flush cycle The results of the sealing

TABLE II

| Film of Ex. No | Sealing Window (° F.) on APET trays | Visual Check Pressure on APET trays | Sealability to CPET trays | Visual Check Pressure on CPET trays |
|---|---|---|---|---|
| 1(2.0 mils) | 275–400 | withstand 18 in. blowout at 20 in | weak at 400° F., 4.02 s | N.T. (insufficient seal) |
| (1.5 mils) | 275–400 | withstand 15 in. blowout at 20 in. | weak at 400° F., 1.02 s strong at 400° F., 2.02 s burned at 400° F., 3.02 s | withstand 5 in., blowout at 10 in. withstand 5 in., blowout at 12 in. leak at 5 in |
| (1.0 mil) | N.T.* | withstand 16 in. leak at 18 in. | weak at 400° F., 1.02 s | N.T. (insufficient seal) |
| 2(5.0 mils) | 300–400 | withstand 12 in. | no seal | N.T. (no seal) |
| 3(2.0 mils) | 275–350 | withstand 16 in. leak at 18 in. | weak, burnt at 400° F., 1.02 s weak, burnt at 375° F., 4.02 s weak at 375° F., 1.02 s | N.T. (insufficient seal) |
| (1.5 mils) | 300–400 | withstand 10 in. leak at 12 in. | weak at 400° F., 1.02 s weak, burnt at 400° F., 4.02 s | N.T. (insufficient seal) |
| (1.0 mil) | 275–400 | withstand 10 in. leak at 12 in. | weak at 400° F., 1.02 s weak, burnt at 400° F., 4.02 s | N.T. (insufficient seal) | only run, including comparisons to a Mylar lidding film control, are set forth in Table IV below.

TABLE IV

| Film of Ex. No. | Sealing to APET | Sealing to CPET | Appearance | Machinability | Max. Force (gmf) | Energy-to-Break (gmf-in) |
| --- | --- | --- | --- | --- | --- | --- |
| 4 | strong seal, burning at 375° F. | weak seal, burning at 350° F. | clear | good | 214 ± 18.5 | 29.1 ± 5.88 |
| 5 | weak at 350° F., strong at 375, 400° F., burning at 400° F. | weak seal, burning at 350° F. | hazy | good | 164 ± 29.9 | 16.0 ± 5.69 |
| 6 | strong seal (strongest at 400) no burning | weak seal, burning at 375° F. | hazy | good | 175 ± 24.5 | 19.5 ± 4.36 |
| 7 | strong seal, burning at 400° F. | weak seal, burning at 350° F. | clear | good | 227 ± 6.17 | 24.9 ± 6.84 |
| 8 | strong seal, burning at 400° F. | weak seal, burning at 350° F. | hazy | slight cutting difficulty | 305 ± 77.9 | 32.9 ± 11.5 |
| Mylar control | strong seal, no burning | strong seal no burning | clear | good | 754 ± 30.1 | 82.0 ± 9.52 |

The films of Examples 9–11 were tested for sealability to CPET and APET trays on a Ross Reiser packaging machine at the following settings: vacuum—60 mbar, gas—63 mbar, sealing time 1.5 s, seal temp.—375° F., speed—10 cycles/min All films sealed well enough to both APET and CPET trays to survive the vacuum/gas flush cycle. Generally, however, the films sealed strongly to APET trays but not as strongly to CPET trays.

We claim:

1. A method for making a multilayer film comprising:
coextruding at least a sealant layer, a gas barrier layer and an abuse layer, the sealant layer comprising a polyethylene terephthalate copolymer, wherein the diol component of the polyethylene terephthalate copolymer comprises greater than about 50% by mole of glycol polymerization units, and the gas barrier layer comprising at least one member selected from the group consisting essentially of ethylene vinyl alcohol and vinylidene chloride.

2. The method set forth in claim 1 wherein the step of coextruding a multilayer film comprises hot blowing the film.

3. The method set forth in claim 1 further comprising the step of orienting the film.

4. The method set forth in claim 1 wherein the step of coextruding comprises coextruding at least one further internal layer with the sealant layer, the barrier layer, and the abuse layer.

5. The method set forth in claim 4 wherein the further internal layer comprises an adhesive layer.

6. The method set forth in claim 4 wherein the further internal layer comprises a core layer.

7. The method set forth in claim 1 wherein the abuse layer comprises a polyester.

8. The method set forth in claim 1 wherein the abuse layer comprises a polyamide.

9. The method set forth in claim 1 wherein the abuse layer comprises a polypropylene.

* * * * *